Feb. 5, 1957 T. MILLER 2,780,731
CONTROLLING THE LUMINOSITY OF A PHOSPHOR SCREEN
Filed Aug. 24, 1951
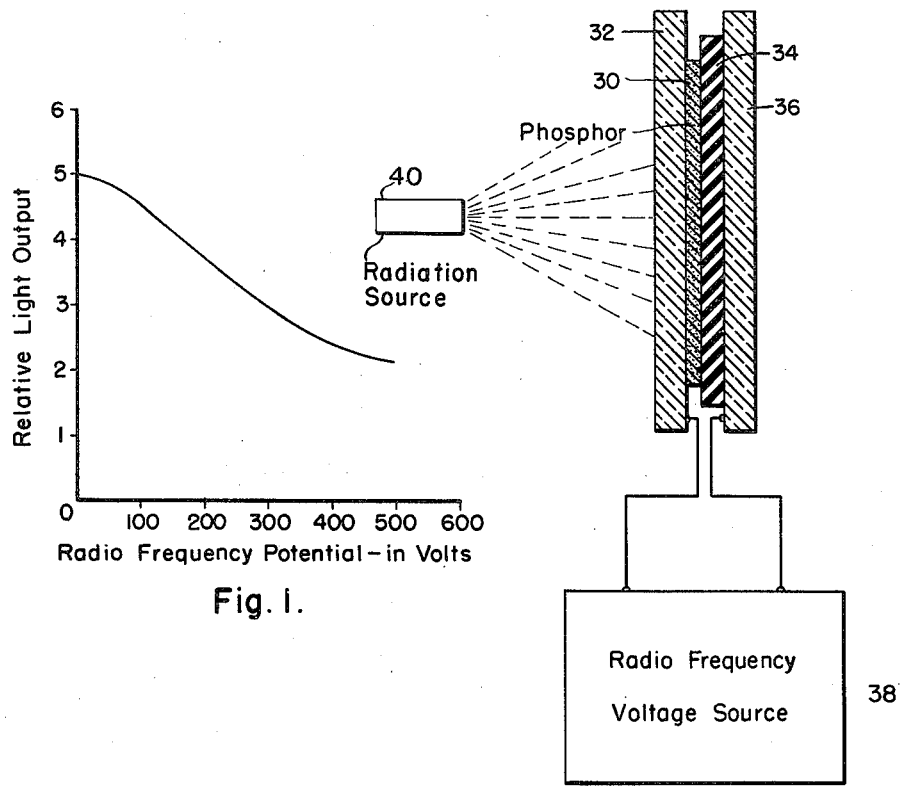
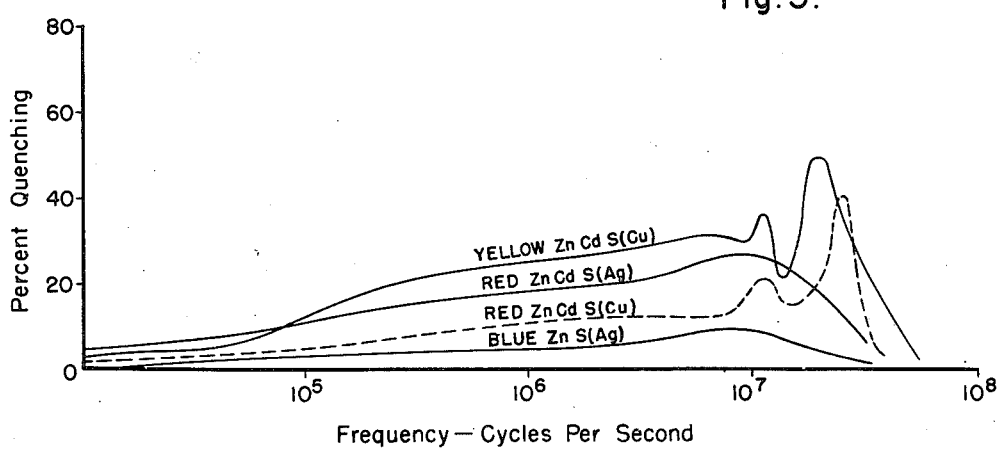
WITNESSES: INVENTOR
Theodore Miller.
BY
ATTORNEY

United States Patent Office 2,780,731
Patented Feb. 5, 1957

2,780,731

CONTROLLING THE LUMINOSITY OF A PHOSPHOR SCREEN

Theadore Miller, Pittsburgh, Pa., assignor to Westinghouse Electric Corporation, East Pittsburgh, Pa., a corporation of Pennsylvania Application August 24, 1951, Serial No. 243,487

10 Claims. (Cl. 250—71)

My invention relates to controlling the luminosity of a phosphor material, independent of the source of excitation of said phosphor material. In certain of its aspects, my invention relates to effectively quenching the light output or luminescence of a phosphor material, and may be extended to effect color switching of the luminescence from a multi-color screen made of phosphor or similar materials.

For certain phosphor screen applications, it is desirable to effectively control the output luminescence of the screen, independently of the excitation source. The latter excitation source may comprise ultra-violet radiations, an electron beam, or, more generally, any source of phosphor exciting radiations.

It is an object of my invention to control the luminescence of an excited screen, independently of the source of exciting radiations.

It is another object of my invention to control the output light intensity of a phosphor material, in a manner which is continuously variable and capable of a relatively fast time response.

It is another object of my invention to provide a multicolor screen, made up of phosphors or the like materials, and effect color switching of the light output from said screen in an improved manner.

It is still another object of my invention to control the luminescence from a phosphor screen, which is capable of luminescing in a plurality of colors, such that color selection may be accomplished independently of the source of phosphor exciting radiations.

It is a still additional object of my invention to so control a luminescing screen, such as a phosphor screen, to make said screen luminesce in a selectable variety of colors, independently of the source of excitation for said screen.

In accordance with my invention, I control the output light intensity from a screen, made up, for example, of excitable phosphor materials, by the application of a radio frequency electric field across said screen, the frequency and strength of said field being controllable. Pronounced quenching of the output luminescence from said screen is obtainable by varying the effective strength of said electric field, namely the R. F. potential which is applied across said screen to produce said field may be varied in magnitude to effectively quench or control the output luminescence from said screen, when it is separately excited by a source of a radiant energy beam, such as a source of ultra-violet radiations or an electron beam. Also, in accordance with my invention, the frequency of the applied electric field may be varied to further control the output luminescence from the excitable phosphor material screen, in conjunction with the aforesaid control of such luminescence which is available by a variance of the intensity of the electric field.

The novel features that I consider characteristic of my invention are set forth with particularity in the appended claims. The invention itself, however, both as to its organization and its method of operation together with additional objects and advantages thereof, will best be understood from the following description of specific embodiments when read in connection with the accompanying drawing, in which:

Figure 1 shows a curve that illustrates the output light intensity as a function of the radio frequency potential, which is applied across the luminescing screen of phosphor material;

Fig. 2 illustrates the percentage quenching, which represents the effective variance in output light intensity from the excited screen of phosphor material, as a function of the frequency of the electric field which is applied across said screen; and Fig. 3 illustrates one manner of practicing my invention.

The luminosity of an excitable screen, such as a screen made up of phosphor materials, has been found to be controllable by the application of a relatively high frequency electric field across said screen. In actual practice, pronounced quenching of such luminosity has been obtained with field strengths in the order of 20,000 volts/cm. The latter figure, of course, is dependent upon the size of screen employed.

This is illustrated in Fig. 1, which shows the output luminescence from a typical phosphor screen as a function of the radio frequency potential which is applied across said screen. In an actual experiment, the frequency of the so-applied potential, which was used to obtain the curve shown in Fig. 1, was 1.35 megacycles, and the screen comprised a phosphor material that was excited with a constant intensity source of ultra-violet radiations. The light output was measured by means of a photomultiplier tube.

Color switching is obtainable in accordance with my invention when a multi-color screen, made up of suitable phosphor or like materials, is made to luminesce by means of radiations, such as ultra-violet, an electron beam or a source of similar radiation, and a variable intensity or variable frequency electric field is applied across said screen. The effective degree of luminescence quenching, i. e. output light intensity variation, can be made to vary over a wide range for the respective different-color light-emitting phosphor materials. Further, there is a tendency for a resonant or maximum quenching effect to occur for each of said different-color light-emitting phosphors. This resonant or maximum quenching effect tends to vary in reference to the frequency of the applied electric field for the different phosphors.

As illustrated by the curves shown in Fig. 2, a yellow light-emitting zinc cadmium sulphide phosphor has a resonant or maximum luminescent quenching at a different frequency than a red-light-emitting zinc cadmium sulphide phosphor or a blue-light-emitting zinc sulphide phosphor. The yellow-light-emitting zinc cadmium sulphide phosphor, which was used to obtain the curve shown in Fig. 2, was copper activated. To obtain the curves shown in Fig. 2, there was employed a silver activated zinc cadmium sulphide phosphor which was red-light-emitting and there was employed a copper activated zinc cadmium sulphide phosphor which was also red-light-emitting. The blue-light-emitting zinc sulphide phosphor was silver activated. To obtain the curves shown in Fig. 2, the potential of the applied radio frequency electric field was in the order of 100 volts. Higher R. F. potentials for the applied electric field will in certain applications tend to yield greater percentages of quenching.

It is apparent from the teaching of Fig. 2 that color switching is obtainable between the various colors of the output light, from a multi-color emitting phosphor screen by varying the frequency of the applied radio frequency electric field that is applied across said screen. In this manner, and as illustrated in Fig. 2, by properly choosing the frequency of the electric field that is applied across the screen, one color of light can be made to predominate in the output luminescence from the screen, and the output light from the other-color emitting phosphors may be quenched to relative insignificance.

A multi-color emitting phosphor screen, which is designed to emit light in substantially the primary colors such as red, green and blue, may be employed for color television purposes by selecting respectively red, green and blue-emitting phosphors that effectively resonant or maximum quench at different frequencies of applied electric field. In other words, if the red color light-emitting phosphor and the blue color light-emitting phosphor may be substantially quenched at an applied electric field frequency at which the green color light-emitting phosphor is not appreciably quenched, the resultant light output from such a multi-color phosphor screen will be predominantly and substantially green in color. If the red and green light-emitting phosphors may be substantially quenched in a similar manner at a frequency of the applied electric field at which the blue-light-emitting phosphor is not appreciably quenched, the output light from the screen will be predominantly blue in color. The same is true respecting the provision of a predominantly red color output from the composite phosphor screen.

In Fig. 3 there is illustrated one manner in which the teachings of my invention may be practically applied. A mechanical mixture of any desired combination of phosphor materials 30 may be deposited on one surface of a glass plate 32 which has previously been coated with a transparent and electrically conducting surface film, such as Nesa glass. A thin sheet of dielectric material 34 which has a high electrical breakdown potential such as mica is placed adjacent to the phosphor material 30 on the side of the phosphor material opposite the Nesa coated glass plate 32. A second glass plate 36 which is also coated with a transparent and electrically conducting surface film, such as Nesa glass, is placed on the surface of the dielectric material 34 opposite to the surface of the latter which is adjacent the phosphor 30. A suitable radio frequency potential is applied to the transparent and electrically conducting Nesa glass coatings on the respective glass plates 32 and 36 from a suitable source 38 such that the electric field is effectively placed across the phosphor layer 30. It is to be understood that for ultra-violet excitation of the phosphor material, the glass plate 32 which is positioned between the layer of phosphor material and the source of ultra-violet excitation must not substantially obstruct the passage of the ultra-violet radiation. Materials which are semi-transparent to ultra-violet radiation, and which are suitable for this operation are well known to those skilled in this art. For particularly electron beam excitation of the phosphor material, a relatively thin Nesa coating for the glass plate 32 which is between the phosphor material 30 and a source of electrons should be employed. Also, it might be advantageous to use an aluminum film instead of the Nesa coated glass plate 32 between a source of electrons and the layer of phosphor material. As another manner of providing the electric field across the phosphor materials, a fine wire mesh screen may be used on the electron beam side of the layer 30 of phosphor materials. A radiation source 40 is shown in Fig. 3 for exciting the phosphor.

The curves of Fig. 2 are merely illustrative of the effect of electric field frequency variance and the effective quenching or change in output light luminosity for the particular materials chosen and designated by the respective curves of Fig. 2 and in the description thereof in this specification. It is to be understood that these particular materials were chosen for the purpose of illustration only and are not intended as a limitation thereto. The quenching effect on excitable materials, such as phosphor and others, is applicable to a great many materials other than those having curves shown in Fig. 2.

While I have shown and described certain specific embodiments of my invention, many modifications thereof are possible. My invention, therefore, is not to be restricted except as is necessitated by the prior art.

I claim as my invention:

1. In combination, a pair of electrodes spaced a short distance apart, a layer of sulphide phosphor material adjacent one of said electrodes and between said electrodes, a layer of dielectric material adjacent the other of said electrodes near said other electrode, means for supplying a radio frequency electric field across said phosphor, and means for simultaneously irradiating said phosphor material by radiations causing it to luminesce.

2. In combination with means for producing an electron beam, a screen on which said beam is incident comprising a layer of conductive material transparent to said beam, a layer comprising a plurality of sulphide phosphor materials luminescing in different colors, the respective luminescences of said materials differing from each other when radio frequency electric fields of different frequencies are impressed across said layer, and means for simultaneously subjecting said phosphor layer to a radio frequency potential field between said layer of conductive material and a second conductive layer.

3. In combination with means for producing an electron beam, a screen on which said beam is incident comprising a layer of conductive material transparent to said beam, a layer comprising a plurality of sulphide phosphor materials luminescing in different colors, the respective luminescences of said materials differing from each other when electric fields of different frequencies above 100,000 cycles are impressed across said layer, and means for simultaneously subjecting said phosphor layer to a potential field at a frequency above 100,000 cycles between said layer of conductive material and a second conductive layer, and means for varying the frequency of said alternating potential gradient.

4. In combination with means for producing an electron beam, a screen in the path of said beam comprising a plurality of sulphide phosphor materials which luminesce in different colors under impact of said beam positioned between two layers of conductive material, at least one of said conductive layers being sufficiently transparent to said beam to permit the electrons to pass through it into said layer of material and means for changing the relative intensity of fluorescence of said different phosphor materials by varying a radio frequency potential field impressed between said layers of conductive material simultaneously with the electron beam excitation.

5. In combination with means for producing an electron beam, a screen in the path of said beam comprising a plurality of fluorescent materials which luminesce in different colors under impact of said beam said fluorescent materials being positioned between two layers of conductive material, said fluorescent materials selected from the group consisting of copper-activated zinc cadmium sulphide, silver-activated zinc cadmium sulphide and silver-activated zinc sulphide, at least one of said conductive layers being sufficiently transparent to said beam to permit the electrons to pass through said conductive layer into said fluorescent material and means for changing the relative intensity of fluorescence of said different fluorescent materials due to electron beam excitation by varying a radio frequency potential field impressed between said layers of conductive material simultaneously with said electron beam excitation.

6. The method for controlling the light output from a sulphide phosphor material, comprising exciting said phosphor material with radiation to cause luminescence and applying simultaneously a radio frequency electric field to decrease said luminescence.

7. In combination with means for producing an electron beam, a screen in the path of said beam comprising a plurality of sulphide phosphor materials which exhibit the properties of luminescence in different colors under impact of said beam and differing in quench response to fields of different frequencies, said phosphor materials positioned between two layers of conductive material, at least one of said conductive layers being sufficiently transparent to said beam to permit electrons to pass through said conductive layer into said materials, means for simultaneously impressing a radio frequency field between said conductive layers of material and means for varying the frequency of said radio frequency field to control the luminescence of selected ones of said phosphor materials.

8. In the method for controlling the light output from a sulphide phosphor material comprising the simultaneous application of radiation energy to said phosphor to cause luminescence and the application of a radio frequency electric field to said phosphor to control said luminescence.

9. In the method for controlling the light output from a sulphide phosphor material, the steps of exciting said phosphor material with radiation energy and applying simultaneously across the so excited phosphor material, a radio frequency field of controlled frequency within the range of $10^4$ cycles per second to $10^8$ cycles per second.

10. In the method for controlling the light output from a sulphide phosphor material comprising the simultaneous application of radiation energy to said phosphor to cause luminescence and the application of a radio frequency electric field to said phosphor to quench said luminescence.

References Cited in the file of this patent

UNITED STATES PATENTS

| | | |
|---|---|---|
| 1,928,407 | Batchelor | Sept. 26, 1933 |
| 2,185,439 | Hinderer | Jan. 2, 1940 |
| 2,207,217 | Fodor | July 9, 1940 |
| 2,239,887 | Ferrant | Apr. 29, 1941 |
| 2,243,828 | Leverenz | May 27, 1941 |
| 2,310,852 | Leverenz | Feb. 9, 1943 |
| 2,310,863 | Leverenz | Feb. 9, 1943 |
| 2,546,160 | Lengyel | Mar. 27, 1951 |
| 2,566,349 | Mager | Sept. 4, 1951 |

OTHER REFERENCES

Electroluminescence—A New Method of Producing Light by E. C. Payne et al. Illuminating Engineering, November 1950, pages 688–693. 240–2.25.